Nov. 6, 1934.     T. M. HUNTER     1,979,882
ROTARY WELDING TRANSFORMER
Filed Sept. 15, 1932     7 Sheets-Sheet 1

INVENTOR
THOMAS M. HUNTER
BY
A. D. T. Libby
ATTORNEY

Nov. 6, 1934.　　　T. M. HUNTER　　　1,979,882
ROTARY WELDING TRANSFORMER
Filed Sept. 15, 1932　　7 Sheets-Sheet 2

Nov. 6, 1934.  T. M. HUNTER  1,979,882
ROTARY WELDING TRANSFORMER
Filed Sept. 15, 1932   7 Sheets-Sheet 4

INVENTOR
THOMAS M. HUNTER
BY
A. D. T. Libby
ATTORNEY

Patented Nov. 6, 1934

1,979,882

UNITED STATES PATENT OFFICE 1,979,882

ROTARY WELDING TRANSFORMER

Thomas M. Hunter, East Orange, N. J.

Application September 15, 1932, Serial No. 633,233

12 Claims. (Cl. 219—6)

This invention relates to the design of a transformer of the rotary type which is especially useful in welding metal, particularly tubing.

In my application Serial No. 508,121, filed January 12, 1931, now Patent No. 1,916,218 issued July 4, 1933 I have shown and described a special design of transformer in which the welding rolls are positioned substantially midway between the shaft bearings, preferably of the roller type, so the load is about equally divided on these bearings. This distribution of load is highly desirable because of the heavy pressure required in the welding of thick-walled tubing or when a lap-joint is being welded.

After much further study and experimentation, I have discovered ways and means for further simplifying and cheapening the cost of construction of the transformer shown and described in said application, and it is therefore the principal object of my present invention to provide a more improved form of rotary transformer with the welding rolls placed substantially midway between the bearings of the transformer in which the mechanical details are much simplified, and the electrical characteristics improved.

Another object of my invention is to provide an improved manner of cooling the parts of the transformer whereby an extremely large welding current may be used in the continuous operation of the transformer.

Other objects will appear to one familiar with the design and operation of rotary welding transformers of the kind herein shown and described. In the drawings:

In the various views wherein like numbers refer to corresponding parts, 1 generally illustrates a rotary transformer carried by a shaft 2 supported between the end bearings 3 and 4 which are fastened to but insulated from the base 6 by the insulators 5, this is to prevent a short-circuit in the transformer which would include the shaft, end bearings and base. The tube being welded is grounded through the base 6 by way of the pressure rolls shown on the base directly below the welding wheel.

Figure 3:
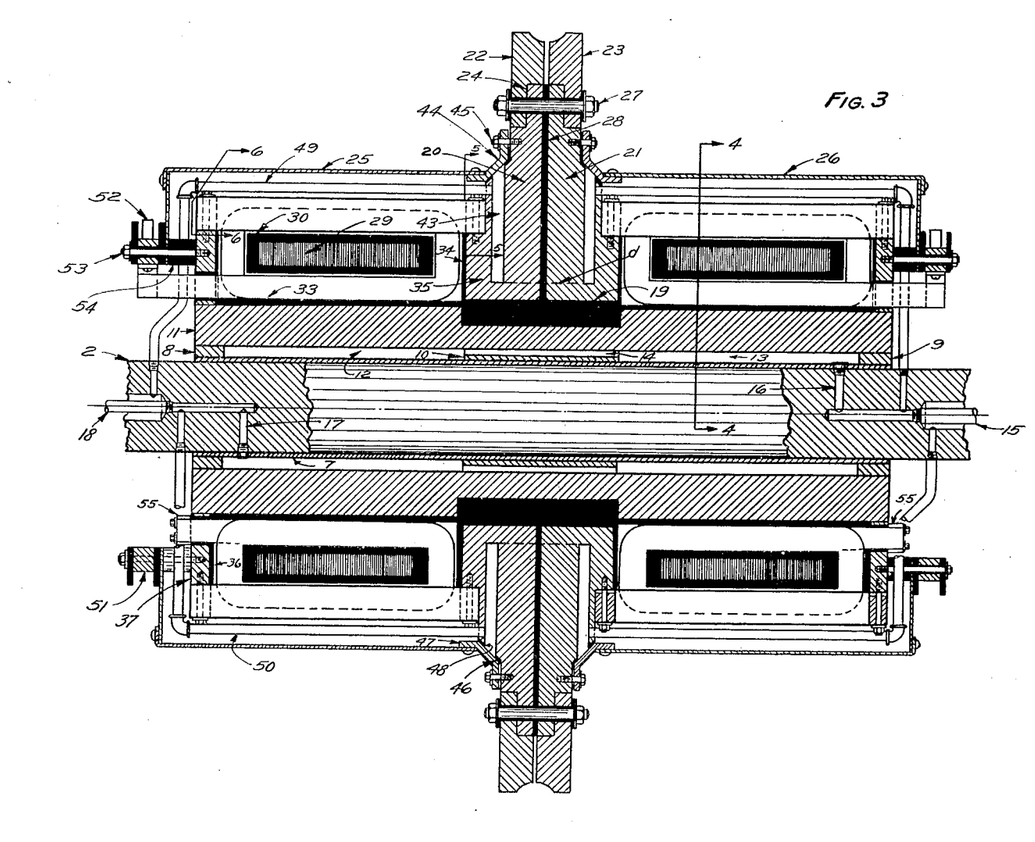
Figure 3 is a longitudinal, sectional view through the transformer.

By reference to Figure 3, it will be seen that the shaft 2 carries a tubular sleeve 7 preferably of copper to keep the cooling fluid, usually water, from contacting with the shaft, thereby preventing rusting of the same. Mounted on the outer ends of the tubes 7 are spacing collars 8 and 9, while at the central point a support collar 10 of considerable length is positioned. The three collars 8, 9, and 10, support a heavy tubular member 11 so as to leave cooling spaces 12 and 13 between the members 7 and 11. The supporting sleeve 10 is provided with a plurality of arcuately-spaced openings 14 whereby the two cooling chambers 12 and 13 are connected together so that the cooling fluid, coming in at inlet pipe 15 and passing through one or more connecting ducts 16 into the chamber 13, may pass through to the annular chamber 12 and out one or more ducts 17 to the outlet pipe 18, thereby providing a large cooling effect to the inner part of the heavy tubular member 11 which is preferably made of good current-conducting material, as the member 11 comprises the inner part of the secondary winding of the transformer.

The member 11 is preferably provided with a centrally located annular recess in which is positioned an insulator 19. For assembly purposes, the insulator 19 may be made in two parts, and on the insulator 19 are positioned the roll members 20 and 21. From what has been said, it will be understood that this construction provides a rigid support for the roll members 20 and 21 at approximately the central point of the shaft between the end bearing supports 3 and 4, so that the heavy load pressure is substantially equally carried by both shaft bearings.

To the outer peripheries of the rolls 20 and 21 are attached removable shoes 22 and 23 which are each shown as a single annular flanged ring, the flanges being indicated at 24. While the rings 22 and 23 may be made in arcuate sectors, I prefer to use in this construction the complete integral rings as it will be noted that the rolls 20 and 21 have a diameter such that the rings 22 and 23 are mounted on the rolls above the outer peripheries of the casing members 25 and 26, so that by removing the bolts 27 that are used for holding the shoes 22 and 23 in position on the rolls 20 and 21, these complete rings may be readily removed for replacement purposes without disturbing any other part of the transformer. It is to be noted that the rolls 20 and 21 are separated by an insulator 28 and that the bolts 27 are insulated from the rolls and the contact shoes.

Figures 4, 5, 6, 7, 8:
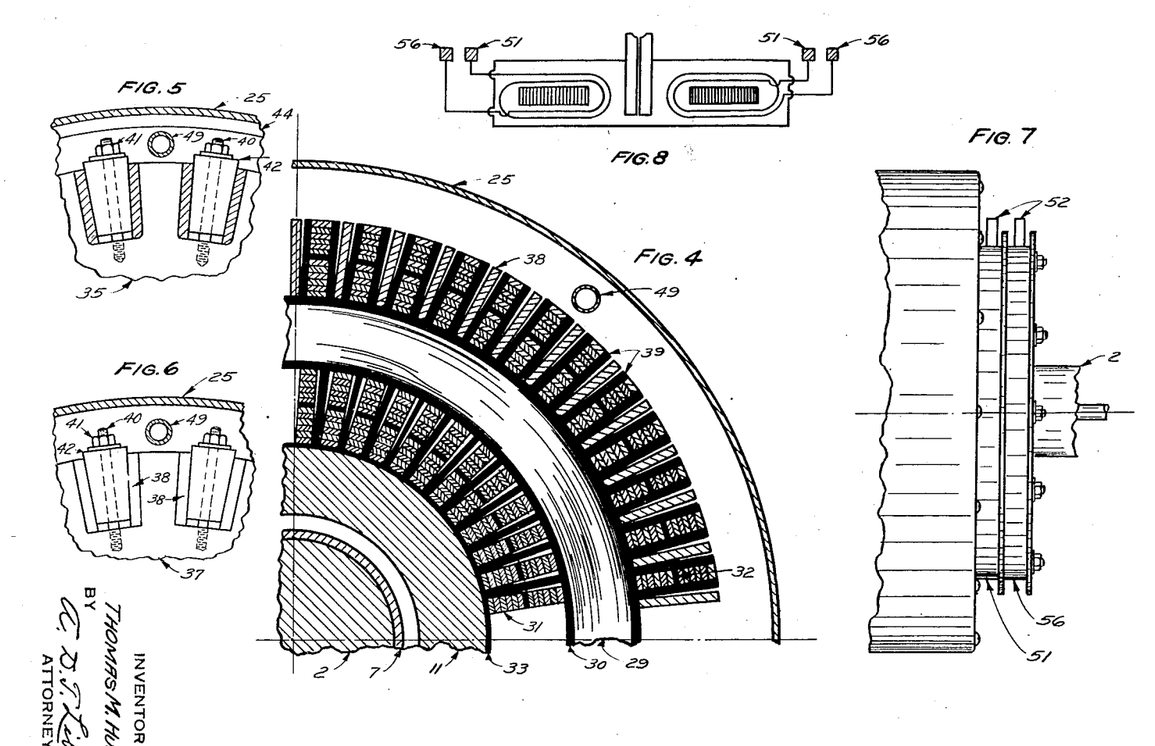
Figure 4 is a quarter section on the line 4—4 of Figure 3.
Figure 5 is a fragmentary section on the line 5—5 of Figure 3.
Figure 6 is a fragmentary section on the line 6—6 of Figure 3.
Figure 7 is a fragmentary elevational view of one end of the transformer, showing the use of two slip-rings which may be used at both ends of the transformer for the purpose of utilizing the two sections of the primary winding either in series or multiple connection for different primary voltages. This arrangement is suitable for use in obtaining a wide range of control of the secondary voltage.
Figure 8 is a diagrammatic view of the circuit connections showing the double slip-rings at each end, whereby the two parts of the primary winding may be connected in series or in parallel.

A feature of this transformer is that the core and primary winding are separated into two sections disposed, one each, on either side of the rolls 20 and 21. As illustrated in Figure 3, the core section 29 is made up of a stack of suitable annular laminations and is surrounded by insulating material 30, and the primary winding is then looped around the core 29 and insulator 30. The arrangement of the primary winding is best shown in Figure 4 wherein each turn of the primary is composed of a plurality (six being shown) of laminated strips 31 of good conducting material, preferably of copper, for each turn. No attempt has been made in Figure 4 to show the cross-connections from one turn of the primary to the other, but it is to be understood that the winding is a continuous ring winding, there being two turns, one outside of the other, on each radius line, separated by insulators 32.

After the primary conductors have been placed around the core in the manner described, this assembly is then pressed on to the member 11, being insulated therefrom by the tubular insulator 33, an insulator 34 being first put into position against the annular flange 35 comprising preferably an integral part of the roll 20. After the core of the primary has been placed into position as above described, the insulator 36 is put into position and then a collar 37 is pressed over the outer end of the sleeve 11. If desired, the collar 37 may be also brazed or welded in position on the sleeve 11. In any event, a good contact must be secured as the secondary current must be carried from the sleeve 11 through the collar 37 to the outer secondary bars 38 which may now be put into position between the insulators 39 that arcuately separate the primary turns from the outer secondary bars 38.

The outer ends of the outer secondary bars 38 are fastened into slots or grooves positioned in the collar 37 and are held in position by the studs 40, on which are positioned nuts 41 that force the wedges 42 to spread the bars 38 and to hold them in secure mechanical and electrical contact with the collar 37, all as illustrated in Figure 6. The inner ends of the outer secondary bars 38 are held in position in slots or grooves in the flange 35 of the roll 20 in a somewhat similar manner as shown in Figure 5.

As will be seen from Figure 3, the annular flange 35 is spaced from the roll 20 so as to provide a cooling chamber 43 that is closed by an annular member 44 held to the roll 20 by a plurality of bolts 45, a gasket 46 being used to provide a fluid-tight joint at this point. An annular lip 47 on the member 44 contacts with a gasket 48 to make a fluid-tight joint with the outer rim of the flange 35. Cooling fluid is carried to the cooling chamber 43 by means of the pipe 49, the outlet being indicated by the pipe 50.

Figure 1:
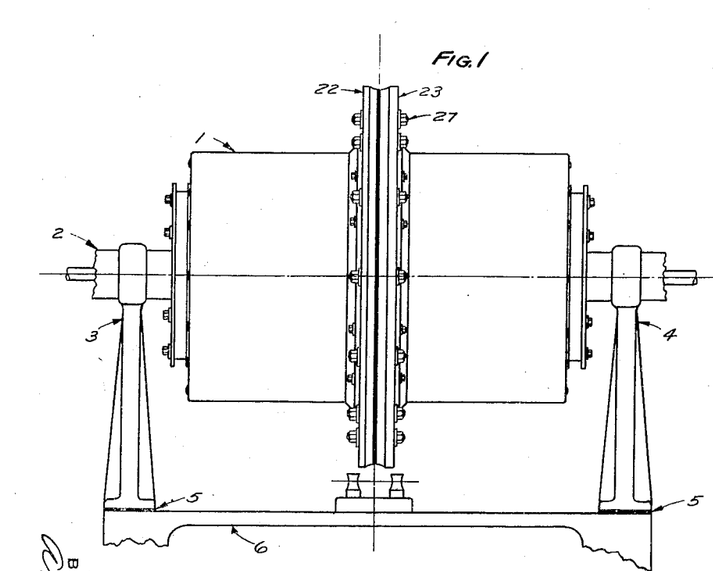
Figure 1 is a side elevation of my improved form of rotary transformer.
Figure 2:
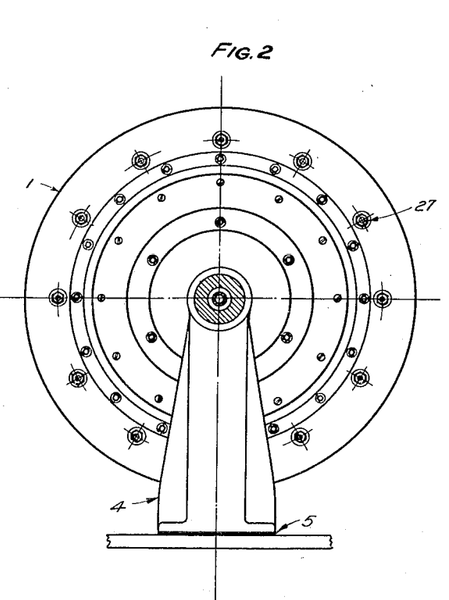
Figure 2 is an end view of Figure 1.

The casing member 25 previously referred to passes completely around the section of the transformer just described, and while giving the transformer a completely smooth and enclosed finish as illustrated in Figure 1, keeps the dirt and other deleterious matter from the winding of the transformer.

At the outer end of the transformer section just described, there is mounted a slip-ring 51 on which one or more brushes 52 may carry the current to the primary winding, it being understood that the ring 51 may be suitably mounted and insulated as by means of bolts 53 and insulator 54, to the collar 37. The end of the primary section winding is brought out to a block 55 either brazed or bolted to the collar 37, and the primary current is then conveyed to the collar 37 and the member 11, to the end of the primary winding on the second section, or that section to the right of the roll 21. The member 11 thus acts as the circuit for both the primary and secondary current.

If it is desired to use two slip-rings as illustrated in Figure 7, the ends of each section of the primary are brought out to the slip-rings 51 and 56, and these may be cross-connected to give the parallel or series arrangement of the two primary windings as desired.

In the modified form of rotary transformer shown in Figures 9 to 18 inclusive, the rolls 20 and 21, separated by insulator 28 and carrying the shoes 22 and 23 arranged and fastened thereto as has been described with respect to Figure 3, are supported on the rings 57 and 58 having flanges 59 and 60 respectively. The rings 57 and 58 are supported on a tubular insulator 61 which in turn is supported on a tube 62 having a flange 63. The tube 62 is likewise supported on another tube 64 having a flange 65. The tube 64 is pressed on the shaft 2 and keyed thereto by key 66. The outer rims of the flanges 59 and 60 are provided with annular bosses 67 engaging annular gaskets 68 to complete cooling spaces 69 on opposite sides of the rolls 20 and 21. By this construction, it will be seen that the inner parts of the rolls 20 and 21 are brought relatively close to the shaft 2, and a very solid and substantial bearing for the rolls is thus provided.

Figures 12, 13, 14:
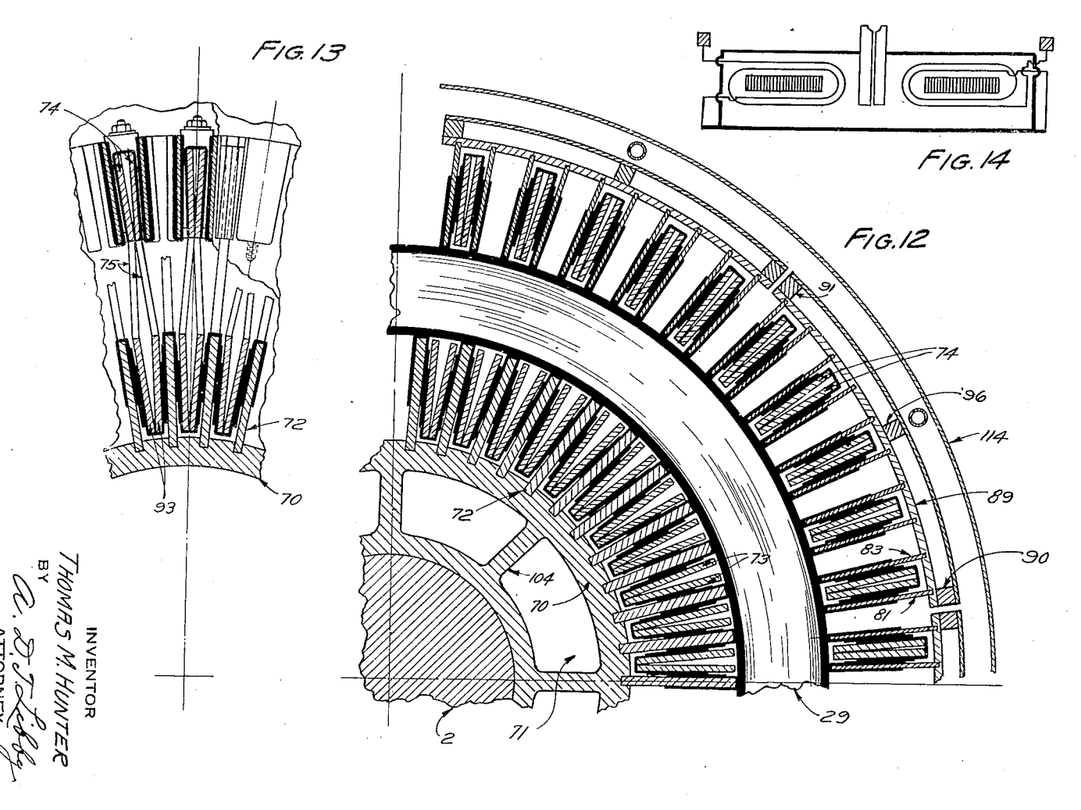
Figure 12 is a quarter sectional view on the line 12—12 of Figure 11.
Figure 13 is a fragmentary view on the line 13—13 of Figure 11.
Figure 14 is a diagrammatic view of the circuit connections of the transformer shown in Figures 9 to 13 inclusive.

Carried on the shaft 2, adjacent the flange 65, is a supporting and cooling drum 70 having a cooling chamber 71. Closely adjacent the flange 63, is a supporting and cooling drum corresponding to the drum 70. Describing one of these structures, the outer surface of the drum 70 is slotted on its outer periphery to receive the inner secondary bars 72 which are welded or brazed into position within said slots about as shown in Figures 12 and 13. Figure 12 also shows two primary bars 73, connected in multiple, positioned between two of the secondary bars 72, but insulated therefrom and from the core 29 by suitable insulators. The outer portions 74 of the turns of the primary are brazed on to the risers from the inner portions 73 at both ends of the core section 29.

Figure 15:
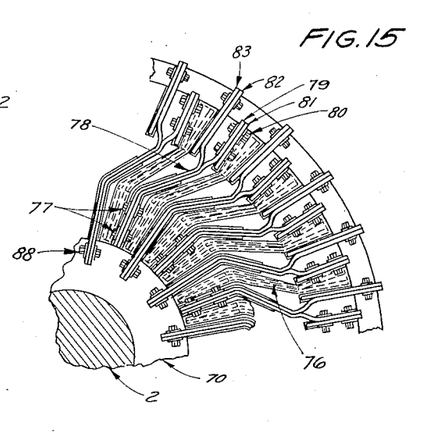
Figure 15 is a view on the plane 15—15 of Figure 11.
Figure 16:
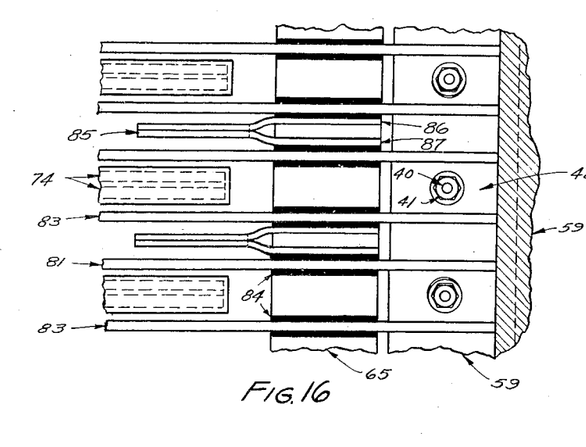
Figure 16 is a plan view looking down on the ends of the primary and secondary conductors along the line 16—16 of Figure 11.

At the inner end or at the end toward the roll 20, the primary risers are straight as indicated by the portions 75 in Figure 13, while at the collector ring end the primary risers have bends 76 therein (see Fig. 15). Since only one collector ring 51 is indicated in the sectional view of Figure 11, it is intended that the end of the primary winding associated with the core 29 is to be connected to the corresponding end of the primary around the right-hand core section by connecting these corresponding ends to the secondary so that the current is transmitted from one side of the primary winding to the other in a somewhat similar manner to that shown and described for Figure 3. However, to attain the connections shown in Figure 8, a double pair of slip rings may be used at opposite ends of the transformer shown in Figure 11.

Figure 11:
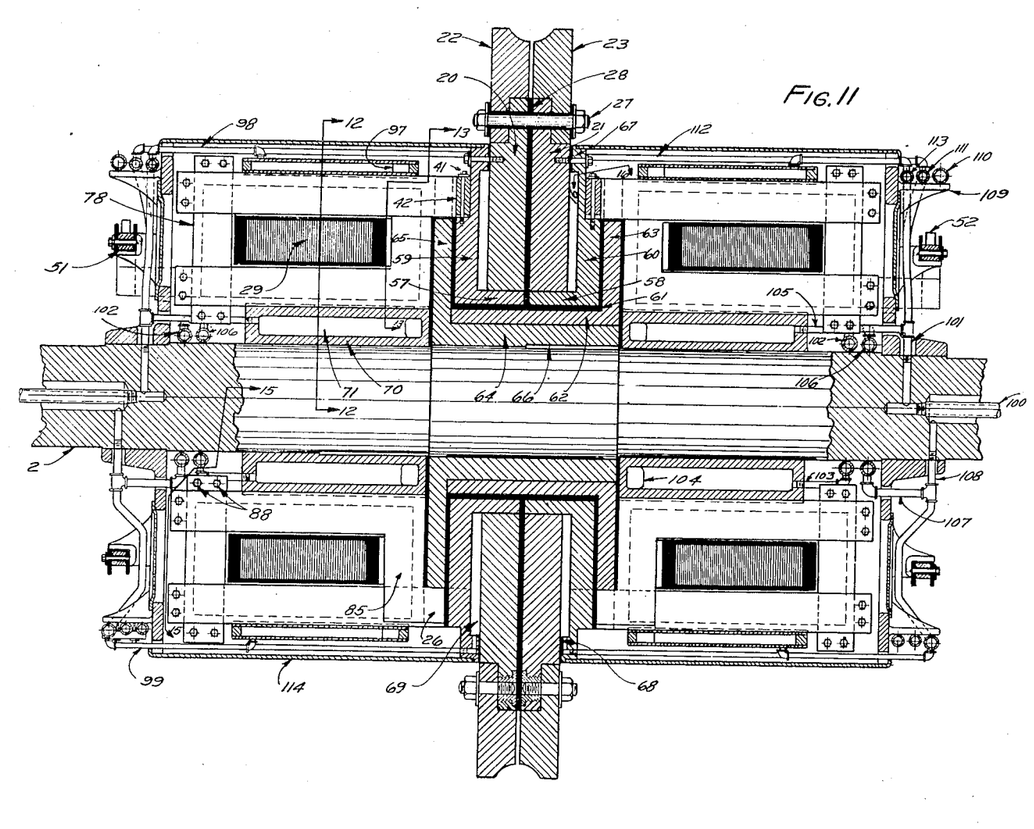
Figure 11 is a longitudinal, sectional view through the transformer of Figure 9.

The outer ends of the secondary bars are connected together in alternate, staggered relationship as indicated in Figures 11 and 15. Each alternate interior secondary end-turn is fastened by bolts 77 to a pair of risers 78 which fork at their outer ends, one fork 79 being fastened by bolts 80 to a bar 81, while the other fork 82 is fastened to a bar 83. The bars 81 and 83, which together form a single conductor, are extended longitudinally over the top of the core 29 (Figure 16) and pass through slots in the flange 65, being insulated therefrom by insulators 84, and then project into slots in the outer periphery of the flange 59 of the ring 57, where they are wedged in grooves or slots in the flange by similar wedges 42 as shown in Figures 3 and 5, which wedges are preferably of metal, although insulating wedges may be used provided the insulation is sufficiently strong. These wedges are drawn radially inwardly by the nuts 41 on the studs 40 as has already been explained in connection with Figure 3.

The roll ends of the inside secondary portions 72 are provided with L-shaped risers 85. The risers 85 are joined by two bars 86 and 87 (see Figure 16) to the flange 65 by reason of the slots in the periphery of this flange into which the bars 86 and 87 extend. At the collector ring end of the inner secondary bars, it will be seen from Figure 15, that alternate turns are differently arranged as the alternate ends of bars 72 are dropped downwardly adjacent the end of the core and are bolted by bolts 88 to bars which correspond in general structure to 81 and 83. This arrangement is necessary in order to get at the bolts 77 and 88 for fastening the risers to the bar ends.

Figure 17:
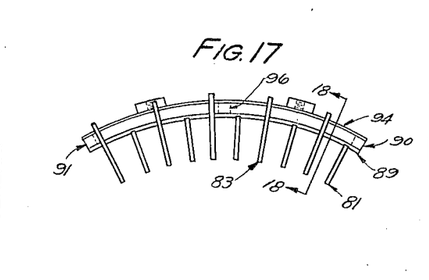
Figure 17 is a fragmentary view looking at the left hand end of Figure 11, of one sector of the cooling jacket, showing the ends of the secondary bars connected thereto.

The manner of cooling the primary and outer turns of the secondary bars is substantially the same as shown and described in my application Serial No. 619,760, filed June 28, 1932, but to make the present construction clear, it may be briefly stated that the outer secondary turns are fastened to an arcuately-formed plate 89 which is of non-magnetic metal and preferably slotted to receive the outer edges of the secondary bars 81 and 83 which are welded or sweated to the plate 89. The arcuately-formed plate 89, as shown in Figures 12 and 17, is approximately sixty degrees and is attached to a rectangular-shaped frame, the two sides 90 and 91 of which are shown in Figures 12 and 17, the ends of the frame being 92 and 93 (see Figure 18). The plates 89 and 94 are held in spaced relation by spacing blocks 95 arranged at suitable intervals.

Figure 18:
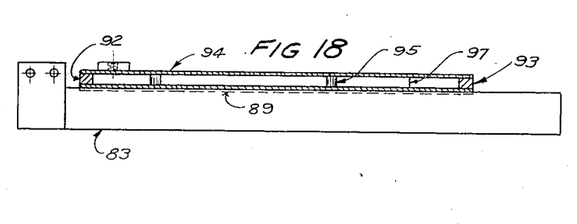
Figure 18 is a section on the line 18—18 of Figure 17.

This frame construction, composed of the members 90 to 93 inclusive, is attached in relation to the arcuately-formed plate 89 and the arcuately-formed plate 94, thereby completing a cooling chamber in direct association with the outer turns of the secondary bars, and through the intimate relation of the outer turns of the primary and secondary bars, considerable heat is picked up from the outer turns of the primary bars through the said secondary bars in the cooling frame structure just described.

Across the center of this cooling frame and between the plates 89 and 94 is a baffle 96, the end of which is indicated at 97. The cooling fluid is fed to one of the compartments formed by the baffle 96 by pipe or pipes 98, and after passing through the compartment and around the end 97 of the baffle, leaves the other compartment by way of a pipe 99.

While I have mentioned the arcuate length of the secondary section just described as being sixty degrees, it is to be understood that this sector may be of some other arcuate length, but the object is to make the outer primary and secondary turns with their cooling means in separate, individual units, whereby they may be made up more easily and cheaply, including the assembly operation. In addition, should it become necessary to dismantle this part of the machine, it may be more readily done by arranging the parts in sectors as described.

Cooling fluid is fed by the supply inlet pipe 100, from which a riser 101 feeds into a header 102 and from there pipe 103 feeds into one of the compartments of the chamber 71, which, as a matter of fact, is divided by baffle plates 104 into a plurality of interconnected compartments. After the cooling fluid has circulated within the various chambers or compartments 71, it passes out the exit pipe 105 into the header 106, from which it is discharged by the pipe 107 to the discharge pipe 108.

At the slip-ring ends of the machine, a plurality of brackets 109 are provided for supporting a plurality of headers, the outer one, 110, being the outlet header, while header 111 feeds one or more pipes 112 carrying cooling fluid to the cooling chambers 69 associated with the welding rolls, while the header 113 feeds the pipes 98 supplying cooling fluid to the outer secondary bar and primary conductor cooling chambers as has been described.

Figure 9:
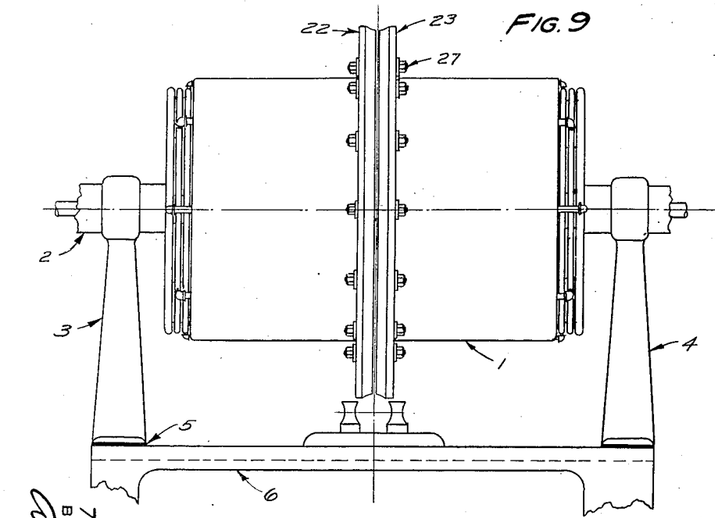
Figure 9 is a view similar to Figure 1 but showing a modified form of the transformer.
Figure 10:
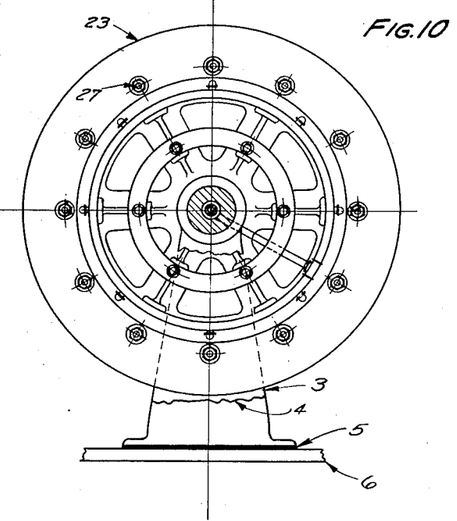
Figure 10 is an end view of Figure 9.

Each section of the transformer after it has been assembled complete with the cooling pipes, is covered by a casing member 114 so that the complete machine presents a smooth finished appearance as indicated in Figure 9.

It will be noted from the construction described with respect to Figure 11, that each welding roll; for example 20, is forced over its ring 57 and securely attached thereto, and likewise the roll 21 is forced over and fastened to its ring 58. Then the annular ring insulator 61 may be inserted and the flanged tube 62 is pressed within said insulator 61. Then the tube 64 is pressed into telescopic relation with tube 62, after which the unitary roll structure is forced on to the shaft 2, and the assembly operations of the primary and secondary bars, with their respective core sections, as has been described, may then be carried out. By this construction, as well as the construction shown in Figure 3, the welding rolls 20 and 21 have an internal diameter less than the internal diameter of the core 29 and such that the rolls are brought relatively close to the shaft 2, thereby carrying the strain on the welding rolls more directly to the shaft. If desired, the welding rolls 20 and 21 in Figure 3 may terminate along the dotted line "d", in which case the rolls are mounted on two flanged rings similar to 57 and 58 in Figure 11.

It is to be noted that in the two forms shown in Figures 3 and 11, the welding shoes attached to the rolls may be mounted after all of the other work on the transformer has been completed, as the inner diameter across the shoes is greater than the outside diameter across the casings 25 or 114.

Certain of the mechanical details entering into the construction of the general design of transformer herein disclosed, may be varied, and I do not wish to be unduly limited in the scope of the appended claims.

Having thus described my invention, what I claim is:

1. A rotary transformer including an annular core arranged in two spaced sections, a primary winding looped around each core section, a shaft for supporting the parts of the transformer and rotating the same, a pair of welding rolls positioned between the core sections, a secondary winding looped around the core sections preferably in intermingled relationship with the primary and terminating in said rolls; said transformer being further characterized in that the welding rolls are supported on flanged rings, the flanges being slotted to receive the roll ends of the secondary winding.

2. A rotary transformer including an annular core arranged in two spaced sections, a primary winding looped around each core section, a shaft for supporting the parts of the transformer and rotating the same, a pair of welding rolls positioned between the core sections, a secondary winding looped around the core sections preferably in intermingled relationship with the primary and terminating in said rolls; said transformer being further characterized in that the welding rolls are supported on flanged rings, the flanges being slotted to receive the roll ends of the secondary winding, and further characterized in that said rings are supported on, but insulated from, a part of the secondary which electrically joins together the two sections of the secondary.

3. A rotary transformer including an annular core arranged in two spaced sections, a primary winding looped around each core section, a shaft for supporting the parts of the transformer and rotating the same, a pair of welding rolls positioned between the core sections, a secondary winding looped around the core sections preferably in intermingled relationship with the primary and terminating in said rolls; said transformer being further characterized in that the welding rolls are supported on flanged rings, the flanges being slotted to receive the roll ends of the secondary winding, said flanges acting with the rolls to form cooling chambers for the rolls, and means for passing cooling fluid to said chambers.

4. A rotary transformer including a shaft and core arranged in two spaced sections, primary and secondary windings on the sections of the core, a pair of welding rolls positioned between the sections of the core and forming terminals for the secondary, the inner part of the secondary comprising a single tubular member carrying an insulator on which said rolls rest.

5. A rotary transformer as set forth in claim 4, further characterized in that said tubular member is recessed to receive the insulator, said shaft being covered by a rust-preventing sleeve, and said tubular member being spaced from the sleeve to form cooling chambers with means for passing cooling fluid through said chambers.

6. A rotary transformer including; a shaft, a large-current-conducting tubular member acting as one part of the secondary winding spaced from said shaft to form at least one cooling chamber, an insulator centrally positioned on said tubular member, a pair of rolls positioned on said insulator, flanges spaced from said rolls but electrically connected thereto to form cooling chambers and to convey current to the rolls, core sections on opposite sides of the rolls, a primary winding around each core section and electrically connected through said tubular member, a secondary winding composed of discs on the other end of said tubular member, and bars extending from the periphery of the discs to said flanges, said bars preferably being intermingled with the primary turns, means for passing current through the primary, and means for passing cooling fluid to all of said chambers.

7. A rotary transformer including a shaft, a pair of flanged tubes telescopically mounted, one over the other, and positioned at the central portion of the shaft, a pair of flanged rings positioned over but insulated from said tubes, a pair of welding rolls fastened to said rings but spaced from said ring flanges to form cooling chambers, a pair of cooling drums arranged one at each end of the flanged tubes, inner secondary bars electrically connected to and spaced around the periphery of said drums, core sections positioned around said bars and each drum, outer secondary bars alternately connected to said flanges with means for completing the secondary turns, a primary winding around each core, means for passing current therethrough, and means for passing cooling fluid through all of said chambers.

8. A rotary transformer as set forth in claim 7, further characterized in that said drums are slotted to receive said bars, and the tube flanges are slotted to allow the bars going to the ring flanges to pass therethrough.

9. A rotary welding transformer as set forth in claim 7, further characterized in that cooling chambers are formed in sectors and fastened to the outer secondary bars, means being provided for passing cooling fluid therethrough.

10. A rotary welding transformer including a shaft, a core arranged in two spaced sections, a unitary initial assembly comprising; a pair of welding rolls preferably having removable contact shoes, a pair of flanged rings on which the rolls rest, and a pair of flanged tubes supporting said rings but insulated therefrom; said roll assembly being spaced between said core sections and fastened to the shaft, a secondary winding around each core section and terminating in the ring flanges, the parts of the secondary being interconnected through said flanged tubes, a primary winding around each core section and intermingled with the secondary thereon, and means for passing current through the primary.

11. A rotary welding transformer as set forth in claim 10, further characterized in that cooling drums are positioned on the shaft at opposite ends of said roll assembly, and the inner parts of the secondary turns rest on and are electrically connected to said drums.

12. A rotary welding transformer as set forth in claim 10, further characterized in that cooling drums are positioned on the shaft at opposite ends of said roll assembly, and the inner parts of the secondary turns rest on and are electrically connected to said drums, and further characterized in that the outer part of the secondary turns are attached in sectors to cooling chambers, means being provided to pass cooling fluid through all of said chambers.

THOMAS M. HUNTER.